United States Patent
Petersen et al.

(10) Patent No.: US 7,334,609 B2
(45) Date of Patent: Feb. 26, 2008

(54) FLEXIBLE TUBULAR DEVICE

(75) Inventors: Henry Petersen, Flensburg (DE); Soren B. Olsen, Flensburg (DE); Karl Brian Nielsen, Klarup (DK)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 10/535,360

(22) PCT Filed: Nov. 17, 2003

(86) PCT No.: PCT/EP03/13044

§ 371 (c)(1),
(2), (4) Date: Oct. 6, 2005

(87) PCT Pub. No.: WO2004/046594

PCT Pub. Date: Jun. 3, 2004

(65) Prior Publication Data

US 2006/0201568 A1    Sep. 14, 2006

(30) Foreign Application Priority Data

Nov. 18, 2002   (NO) .................................. 20025536

(51) Int. Cl.
*F16L 11/00* (2006.01)
(52) U.S. Cl. .......................................... 138/121; 138/30
(58) Field of Classification Search .................. 138/30, 138/121, 122
See application file for complete search history.

(56) References Cited

U.S. PATENT DOCUMENTS

| | | | | |
|---|---|---|---|---|
| 3,299,417 A | * | 1/1967 | Sibthorpe | 340/605 |
| 3,561,492 A | * | 2/1971 | Kauder et al. | 138/121 |
| 3,779,312 A | * | 12/1973 | Withers et al. | 165/184 |
| 4,246,937 A | * | 1/1981 | Muller | 138/108 |
| 4,327,776 A | * | 5/1982 | Meserole | 138/109 |
| 4,487,660 A | * | 12/1984 | Netzel et al. | 174/28 |
| 4,953,632 A | * | 9/1990 | Sakaya et al. | 165/104.26 |
| 5,492,151 A | * | 2/1996 | Wood et al. | 138/121 |
| 5,507,319 A | * | 4/1996 | Kanao | 138/110 |
| 5,803,132 A | * | 9/1998 | Lupke | 138/141 |
| 6,006,788 A | | 12/1999 | Jung et al. | |
| 6,607,010 B1 | * | 8/2003 | Kashy | 138/121 |
| 6,631,741 B2 | * | 10/2003 | Katayama et al. | 138/121 |
| 2004/0020546 A1 | * | 2/2004 | Furuta | 138/121 |

* cited by examiner

*Primary Examiner*—James Hook
(74) *Attorney, Agent, or Firm*—Hartman & Hartman, P.C.; Gary M. Hartman; Domenica N. S. Hartman (57) ABSTRACT

A flexible tubular device that includes a metal wall in which are formed corrugated convolutions that define corrugated outside and inside surfaces of the device. The convolutions are perpendicular to a longitudinal axis of the device, and each convolution has oppositely-disposed rounded top and bottom portions. The outside surface of the device has first and second sections with change positions therebetween. Each first section extends from one of the change positions to another via one of the top portions. Each second section extends from one of the change positions to another via one of the bottom portions. The length of each first section is at least 10% longer than the length of each second section. The outside surface has a curvature that is numerically smaller at the top portions than at the bottom portions, and changes sign only once at each change position.

12 Claims, 9 Drawing Sheets

Example 1.

FIG. 6

Example 2.

FIG. 7

Example 3.

FIG. 8

Example 4.

FIG. 9

Example 5.

FIG. 10

Example 6.

FLEXIBLE TUBULAR DEVICE

CROSS REFERENCE TO RELATED APPLICATIONS

This application claims the benefit of International Application No. PCT/EP2003/013044 filed Nov. 17, 2003, having a priority claim to Norwegian patent application number 20025536 filed Nov. 18, 2002.

BACKGROUND OF THE INVENTION

The invention relates to a flexible, tubular metal device e.g. a bellows with an internal diameter up to 60 millimeters, said device comprising one or more corrugated convolutions, said convolutions having an overall bell-like shape with rounded top portions and rounded bottom portions, where the curvature of the outside surface of the convolutions is numerically smaller at the top portions than at the bottom portions, said curvature being derived from a curve defined as the intersection of the outside surface of the device and a plane through the longitudinal axis of the device, and where the curvature of said curve changes sign only once at a change position located between a top portion and an adjacent bottom portion, and where the length of a first section on the curve is at least 10% longer than the length of a second section on the curve, said first section extending from one change position to an adjacent change position via a top portion, and said second section extending from one change position to an adjacent change position via a bottom portion.

Flexible, tubular devices such as bellows with one or more convolutions impart a degree of flexibility in pipelines carrying gas, air, water, steam, petrochemicals or any other substance at varying temperatures and pressures. Turbines, pumps, compressors, heat exchangers, reactors and valves are typical types of equipment where bellows can be used to absorb relative movements between the equipment and the connecting pipelines. Unless some compensation for these dimensional changes is provided, high stresses will be induced in the equipment or the piping and might lead to system failure. The inherent flexibility enables bellows to absorb movements in more than one direction and, thereby, leaves a greater degree of freedom in designing the layout of the piping system, compared to using conventional devices such as bends and loops.

In general, a bellows can be applied to four basic movement modes (or a combination of these): axial, angular, lateral, and torsional. The torsional mode is, however, often unwanted because it destabilises the convolution in a way that reduces its ability to absorb other modes. The bellow durability depends greatly on the geometry, the material properties, the manufacturing processes during production, and the boundary and load conditions, e.g. an unrestrained pressurised bellow will expand longitudinally, whereas an axially constrained bellow will restrain pressure thrust from the system without changing its dimensional length. The lifetime of each convolution depends, therefore, on a variety of factors but, in particular, on the ability to absorb movements while having geometry that avoids local peak loads.

The convolution geometry is often based on sound engineering principles and years of experience. This know-how is then used to design a bellows that may be required to withstand exposure to large variations in ambient temperature and pressure, e.g. during equipment start-up, one-time stretching under assembly or numerous movements when in operation. Designing a bellows for a piping system often requires, therefore, a thorough system response examination in order to avoid unfavourable conditions that can later lead to bellow failure.

Within the industry, it is commonly accepted that the leading cause of failure for bellows is due to fatigue or one-time damage during installation. In both cases the bellow is stressed beyond a characteristic threshold value, which leads to failure. A way to resolve this failure type, and thereby increase product liability, is to reduce the stresses during deformation by providing improved convolution geometry. The bellow geometry depends on the number of convolutions, as well as on the total length, skirt length, wall thickness and inner diameter. The convolution geometry depends on convolution height, pitch and wall thickness. These are the common design variables, which can be adjusted for a specific application through empirically based safety factors and years of experience. Often the design is based on modifications of a "U" span, "S" span, "V" span, or "Ω" span, from where engineering design data and safety factors are generated. These shapes are "built-up" from simple geometric shapes (primitives) like straight lines and circle sectors, which are easy to draw, analyse and easily programmable into a CNC interface before cutting metal for the forming tools. When such a convolution shape, combined with a material, which is often stainless steel, and a manufacturing process, fulfils customer requirements and expectations, the design may become the best practise within a specific area, even without being the best solution.

The susceptibility of the convolution to fatigue failure is, therefore, increased by geometric stress raisers that are more predominant than wall thickness variations such as material thinning in the convolution nose-tip area as a result of the forming process. For this reason, the bellow failure modes have resulted in the production of bellows in expensive high-grade materials, e.g. stainless steel, which allow a poor convolution design to offer an acceptable performance durability.

A bellow may be required to withstand a very large number of load cycles, such as those from a running engine. The cyclic stress range controls the overall fatigue life of the bellow and if the engine goes through several start-up and shut-down phases, the stress range will control the cumulative fatigue life. In both cases the fatigue life depends on the total number of completed cycles and upon the mean stress and total stress range to which the bellow is subjected. With a decreased amount of stress, a bellows will withstand a greatly increased number of repetitions before failure, whereas at a higher stress level, failure will occur after a relatively fewer number of reversals.

When bellows need to be specially designed for a high cyclic life, the literature is scarce in specifying characteristic design variables or dimensional ranges for an optimal convolution shape. In these cases, the bellow manufacturer must be advised of the expected number of cycles and, based on empirical generated design data from historical successful designs in connection with estimated material and manufacturing constants, a safe convolution design might emerge. The literature is, in addition, limited with regard to estimating fatigue data for calculating the lifetime of current standard spans, e.g. the data varies greatly when the pitch-height convolution ratio varies.

Guidance on design of bellows etc. may e.g. be found in "Standards of the Expansion Joint Manufacturers Association, Inc.", 25 North Broadway, Tarrytown, N.Y. 10591.

U.S. Pat. No. 6,006,788 discloses a metal tube having helical corrugations. The helical design is used for continuously winding a wire around the tube. The helical corrugations cause twisting of the tube when the tube is subjected to bending. In many automotive applications, fuel lines, brake lines etc. the ends of tubes/pipes are fixed, but vibrations and other movements will create repeated bending and thereby twist. However, the twist is locked due to the fixed ends whereby significant stresses are caused. Repeated stresses lead to metal fatigue and component failure.

The shape of the corrugations, as displayed in FIG. 4 of U.S. Pat. No. 6,006,788, is a combination of smaller circular sections with radius r and larger circular sections with radius R. Calculations have, however, shown that significant stress-raisers are present fx by the transitions between the circular sections. Although the disclosed shape may obtain high flexibility, the stress-raisers will decrease the live span under repeated loading due to fatigue. An improved design is hence desirable.

BRIEF SUMMARY OF THE INVENTION

One object of the present invention is to provide an improved design of a flexible device such as a bellows, for obtaining increased life span and/or obtaining the option of using alternative materials, compared to the known designs. Another object is to provide the option of using less costly materials and/or lighter materials.

The novel and inventive aspects of the device according to the invention involve the device having convolutions oriented perpendicular to a longitudinal axis of the device and defining a curve that is continuous and has non-constant curvature.

All geometrical transitions and bends result in stress raisers and a design must be obtained where the magnitude of such unavoidable present stress raisers is reduced. Compared to the standard U-shaped convolution, the increased flexibility is achieved by making higher convolutions, without significantly increasing the convolution width. At the same time, having a smaller curvature in the top portion, thereby reducing the stress raisers for this region, reduces the total stress level during deformation of the convolution. The design with a curve having a curvature, which changes sign only once at a change position located between a top portion and an adjacent bottom portion, provides a smooth transition between the top and bottom portions. To minimize the stress level by the top portion, the length of the first section on the curve is at least 10% longer than the length of the second section on the curve, both sections extending from the locations where the curvature changes sign. In this way the locations, where the curvature changes sign, are shifted towards the bottom portions and thus provide a design with narrow bottom portions and wider, smooth top portions, which significantly reduces the overall stress level. This provides an improved design of the flexible device whereby increased life span is obtained. Also, the improved design provides options to use alternative materials, compared to the known designs, e.g. aluminium instead of stainless steel. In this way, less costly materials and/or lighter materials may also be used.

In another embodiment the length of a first section on the curve may be at least 50% longer than the length of a second section on the curve, said first section extending from one change position to an adjacent change position via a top portion, and said second section extending from one change position to an adjacent change position via a bottom portion. This gives further priority to the shape at the top portions and further reduces the overall stress level.

In a further embodiment the curvature of the convolutions may numerically be at least 20% smaller by the top portions than by the bottom portions, which results in a reduction of the overall stress level.

The pitch-height ratio(q) may in preferred embodiments be between 0.7 and 1.0.

In yet a further embodiment the curve between a bottom portion and an adjacent bottom section may have one global maximum placed at the top portion and two global minima, said minima being placed by the bottom portions, and the curvature by the global maximum of the curve may have a local minimum. This provides an improved shape with significantly reduced effect of the present stress raisers, and a high degree of utilization of the material.

In a still further embodiment the curvature of the curve between a top position and an adjacent bottom section has a local minimum. This provides a smooth shape without abrupt geometrical changes.

In a preferred embodiment a section of the curve, corresponding to one convolution from one bottom portion to an adjacent bottom portion, is symmetric about an axis perpendicular to the longitudinal axis and through the global maximum within the top portion.

In another preferred embodiment the majority of the convolutions may be substantially identical.

In a further preferred embodiment the device may be made of an extruded metal alloy pipe and the convolutions may be formed in a deep drawing process such as elastomeric forming or hydro forming.

In yet a further preferred embodiment the metal alloy may be stainless steel or an aluminium alloy.

The device may be used for flexible coupling of pipes or tubes in a vehicle, e.g. a car, preferably for the coupling of pipes or tubes in the air-condition system. It may have a number of other uses, such as in a charge air cooling system etc.

BRIEF DESCRIPTION OF THE DRAWING

In the following the invention is described with reference to the drawings, which display examples of embodiments of the invention.

DETAILED DESCRIPTION OF THE INVENTION

Figure 1:
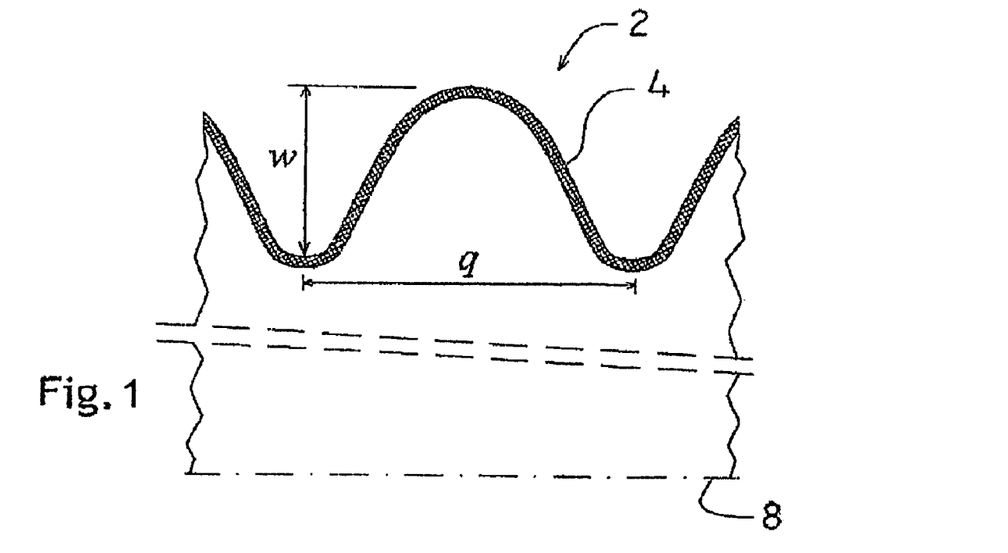
FIG. 1 shows part of a cross section of a flexible, tubular device, said cross section being taken along a plane through the longitudinal axis of the device.

FIG. 1 displays a flexible, tubular device comprising a number of convolutions 2. The outside surface of the device is indicated by reference number 4. The pitch and the height of the convolutions are indicated by the references q and w. The longitudinal axis of the device is indicated by the reference number 8.

The height w is determined by the maximum material elongation before necking occurs. Necking is the phenomena that the wall thickness locally becomes very thin, and thereby result in a risk of cracking of the material, during a deep drawing process, e.g. elastomeric forming.

Figure 2:
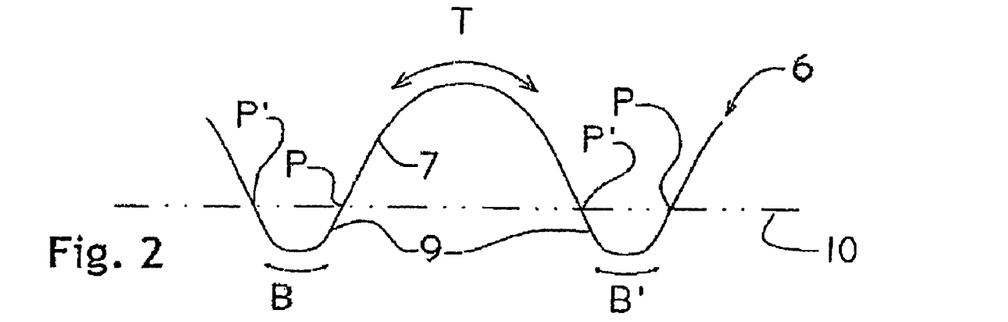
FIG. 2 shows a curve defined as the intersection of the outside surface of a flexible, tubular device and a plane through the longitudinal axis of the device.

FIG. 2 displays a curve 6 with rounded top portion T and rounded bottom portions B and B'. The top portion T is located by the global optimum of the curve 6. The bottom portions B,B' are located by the global minima of the curve 6. The curvature of the top portion T is smaller than the curvature of the bottom portions B, B'. A line 10 is indicated where the curvature is approx. zero/null. This is further indicated by the change positions P and P'. The section 7 extends from the change position P via the top portion T to the change position P'. The section 7 is longer than a section 9 which extends from a change position P via a bottom portion B,B' to a change position P'.

The convolutions may be placed perpendicular to the longitudinal axis 8 of the device or they may be formed as a helix along the longitudinal axis.

Figure 3:
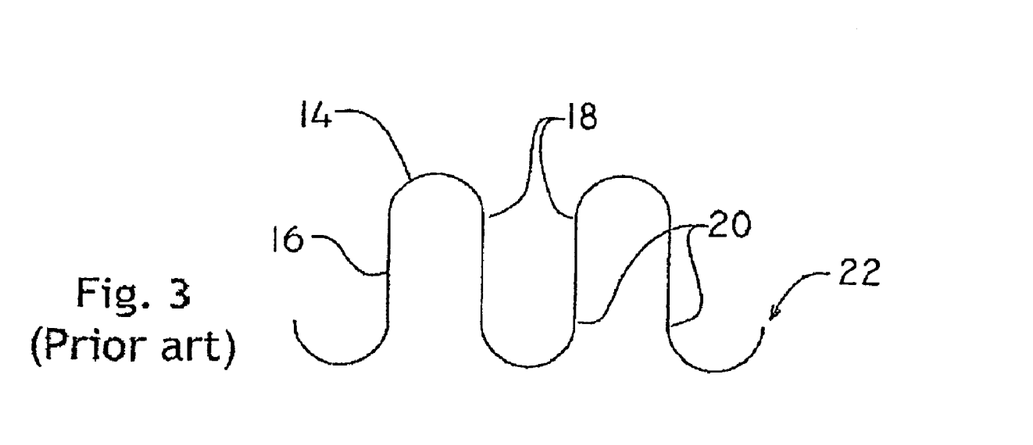
FIG. 3 shows a curve defined as the intersection of the outside surface of a flexible, tubular device, according to prior art, and a plane through the longitudinal axis of the device.

FIG. 3 displays a curve 22 indicating a pure U-shape of the convolutions. The curve 22 is constructed merely by primitives, straight lines 16 and circular arcs 14. This design involves serious stress raisers at the locations 18 and 20. This may simply be verified e.g. by a FE analysis using commercially available software such as e.g. Cosmos® or Ansys®.

Figure 4:
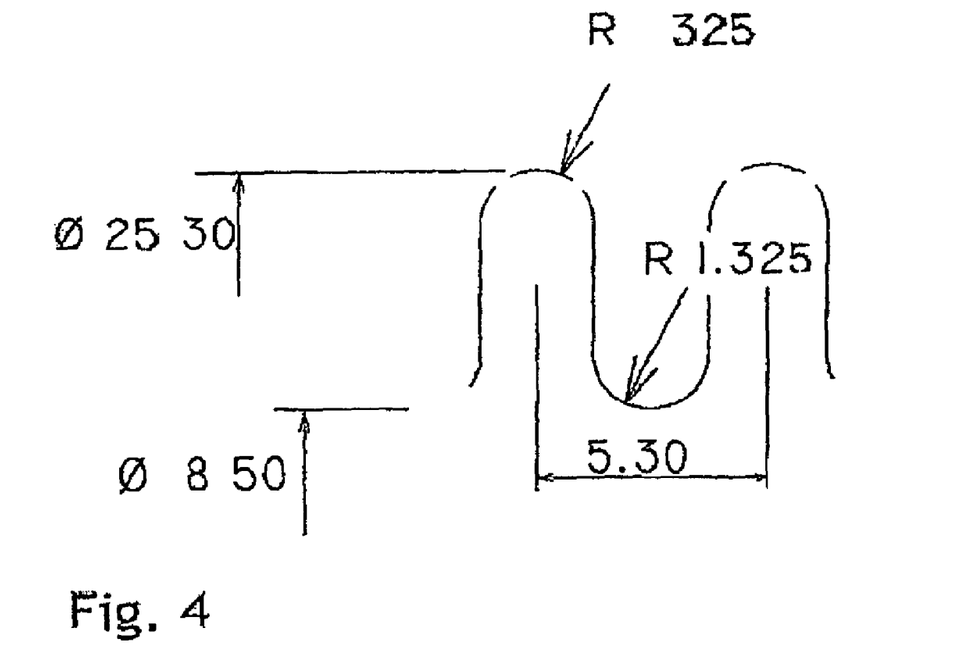
FIG. 4-5 show curves each defined as the intersection of the outside surface of a flexible, tubular device according to the state of the art and a plane through the longitudinal axis of the device.
Figure 5:
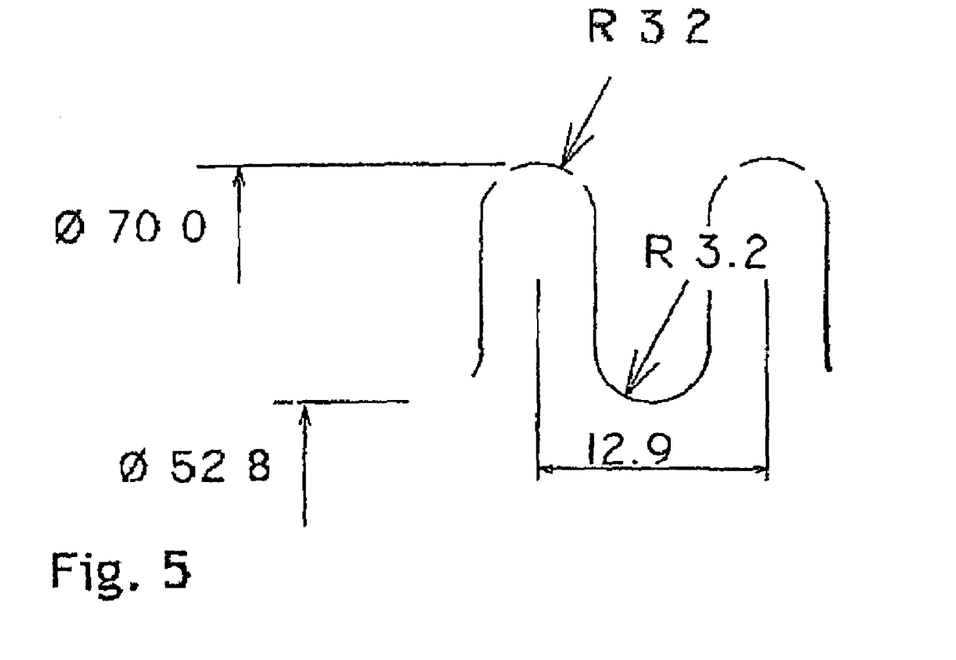
Figure 6:
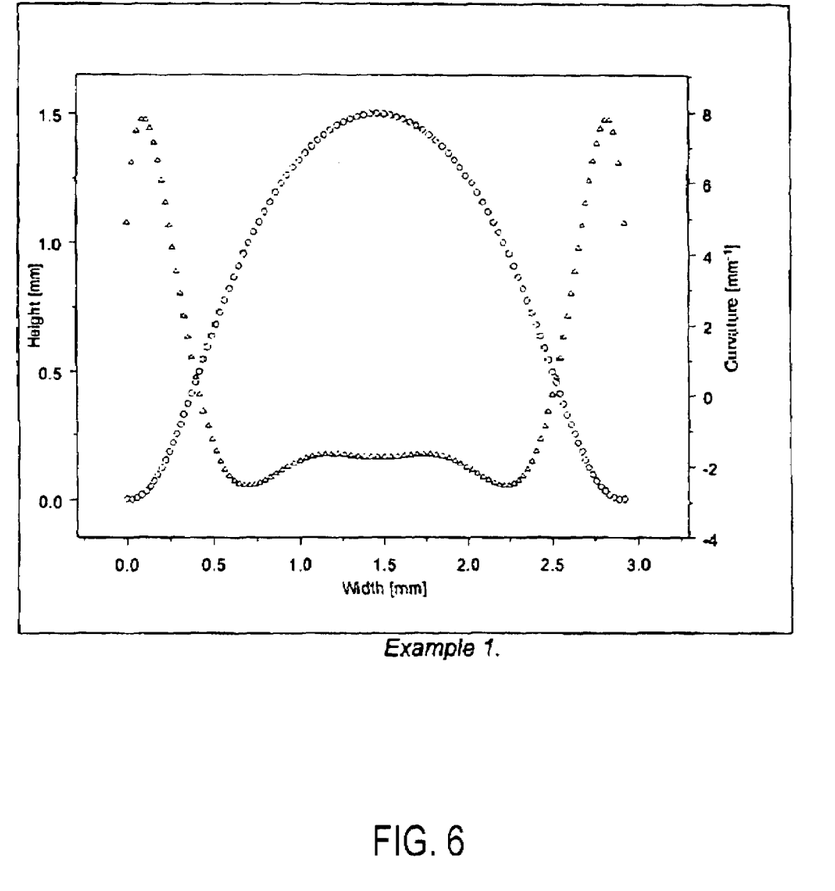
FIG. 6-12 show examples of curvatures of flexible tubular devices according to the present invention and set forth in Table I.
Figure 7:
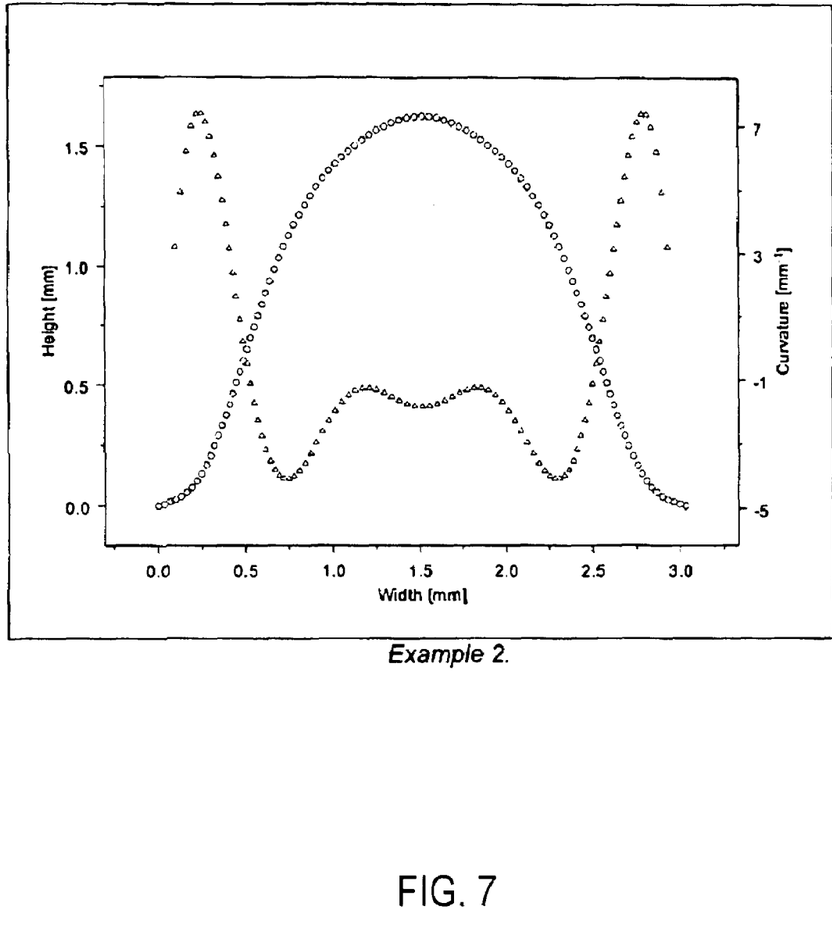
Figure 8:
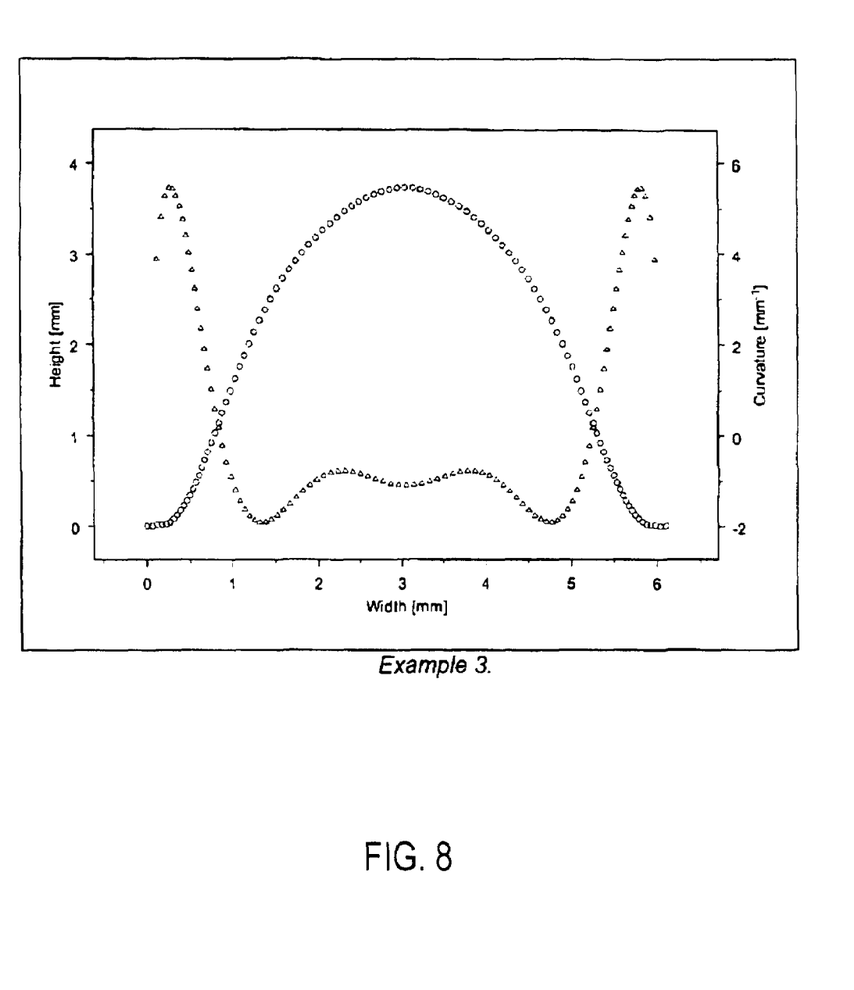
Figure 9:
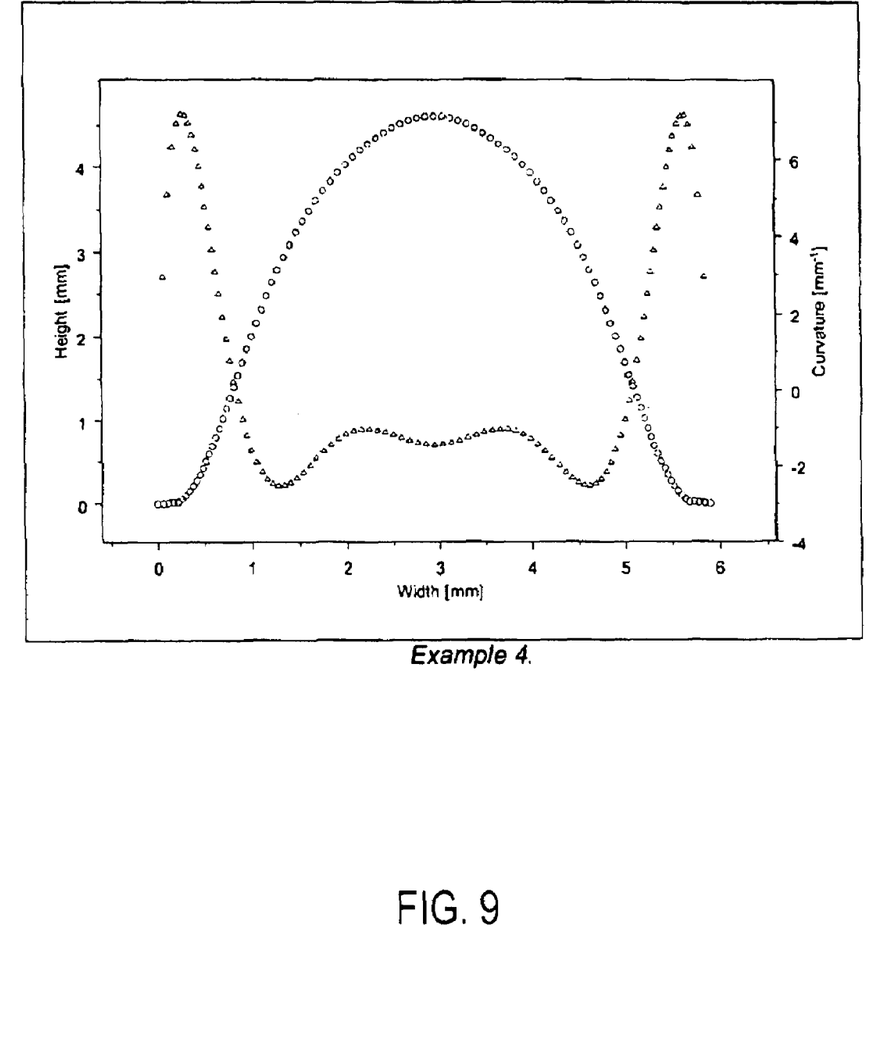
Figure 10:
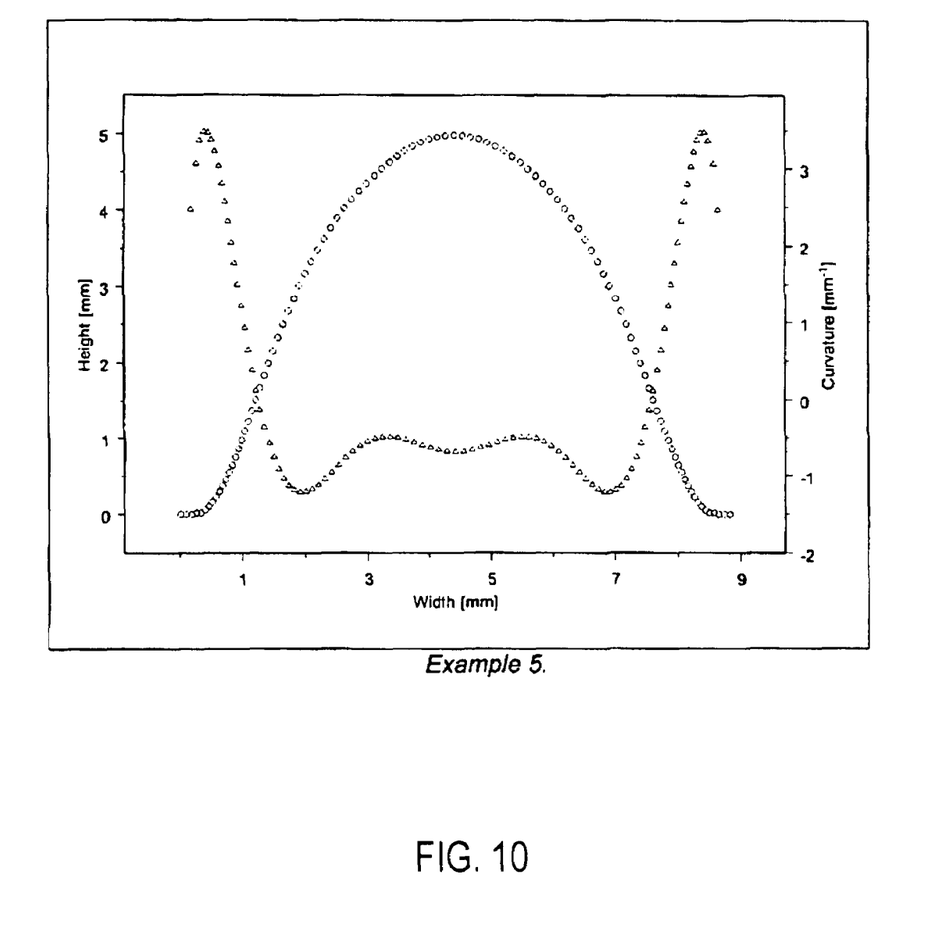
Figure 11:
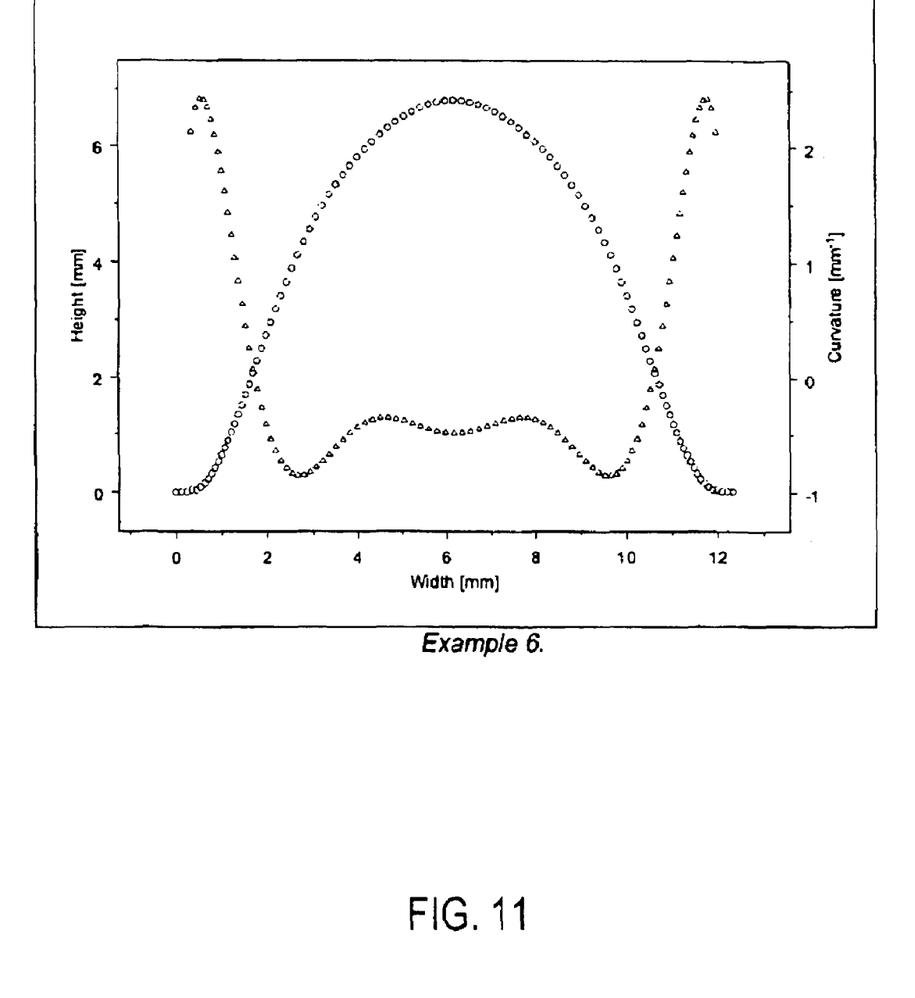
Figure 12:
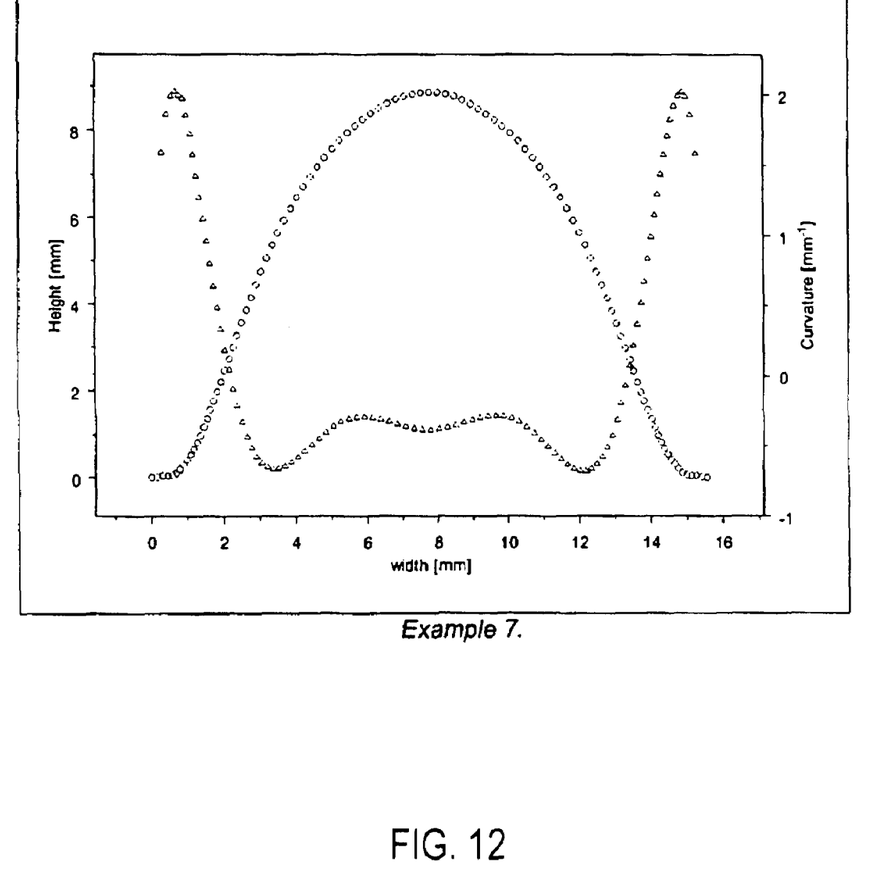

FIG. 4 displays a curve 24 indicating a pure U-shape of the convolutions. The measurements are used for reference tests, Ref A (FIG. 4) and Ref B (FIG. 5), according to Table 2 below. FIG. 5 displays a curve 26, also indicating a pure U-shape. The designs of FIGS. 4 and 5 are believed to be the industry state of the art and are provided by the company RANFLEX India Pvt. Ltd. of India. The design of Ref A is the result of several manufacturing trials based on years of experience. The design of Ref B is also based on years of experience in manufacturing bellows, but has not been manufactured yet, which means that the actual final design may change a few tenths of a millimetre (1/10 mm). This will however not significantly change the result outlined in Table 2. For informative reasons it must be underlined that manufacturing the shapes depicted in the examples as well as the shapes according to FIGS. 4 and 5 takes state of the art manufacturing tools and skills. It is e.g. necessary to make sure that an adequate amount of material is available in order to avoid over-stretching of the material, which causes cracking.

EXAMPLES

FIGS. 6 through 12 show seven examples, labeled Example 1 through Example 7, respectively, of designs in accordance with the present invention and discussed below. Table 1 displays the internal diameters, wall thicknesses and material for the examples. In each example the design of one convolution is given, as well as the corresponding curvature relating to the design. The design and curvature are presented as a series of points, which are to be understood as points on a smooth curve through said points, said curve not being depicted. In each example the design of the convolutions is presented by circular marks whereas the curvature is presented as triangular marks. The horizontal axis displays the width of a convolution from one side to another, starting at a bottom portion 6, see FIG. 2, and ending at a bottom portion B' via one top portion T. The vertical axis on the left side depicts the height. Both height and width are in millimeters. The vertical axis on the right side depicts the curvature and the units are 1/mm (inverse millimeters).

TABLE 1

| Example | Internal diameter [mm] | Wall thickness [mm] | Material |
|---|---|---|---|
| 1 | 8 | 0.5 | AA5454 |
| 2 | 8 | 0.5 | AA5049 |
| 3 | 17 | 0.5 | AA5049 |
| 4 | 17 | 0.5 | AISI 316L |
| 5 | 25.4 | 1.0 | AA5049 |
| 6 | 38.1 | 1.0 | AA5049 |
| 7 | 50.8 | 1.0 | AA5049 |

It may be noted that although Example 3 and 4 are similar in shape, the height of the convolution in Example 4 is larger. This is due to the difference in material properties between stainless steel and the aluminum alloy.

| Example | q [mm] | w [mm] | $\frac{q}{2w}$ | Flex [mm] |
|---|---|---|---|---|
| 1 | 2.92 | 1.50 | 0.97 | 0.10 |
| 2 | 3.03 | 1.62 | 0.94 | 0.15 |
| Ref A | 5.30 | 3.65 | 0.73 | 0.10 |
| 3 | 6.10 | 3.72 | 0.82 | 0.32 |
| 4 | 5.91 | 4.61 | 0.64 | 0.73 |
| 5 | 8.83 | 4.96 | 0.89 | 0.64 |
| 6 | 12.34 | 6.78 | 0.91 | 0.97 |

TABLE 2

| Ref B | 12.90 | 8.60 | 0.75 | 0.52 |
|---|---|---|---|---|
| 7 | 15.56 | 8.84 | 0.88 | 1.35 |

The column in Table 2 marked "Flex" displays the flexibility of one convolution, said flexibility is expressed as the total deflection when one end at a bottom portion B (FIG. 2) is fixed and the other end at bottom portion B' is displaced between a first situation, just before yielding takes place in compression to a second situation, just before yielding takes place in tension.

The displacement is parallel to the longitudinal axis 8, FIG. 2, of the device. In the first situation B' is nearer B (compression) than in the second situation (tension). The flexibilities are found by FE analysis taking material and manufacturing (thinning etc.) parameters into consideration and represent close approximations to factual behavior of manufactured flexible devices.

Also, in Table 2 two references, Ref A and Ref B, are displayed. For Ref A the material and wall thickness are the same as in Example 3, i.e. AA 5049 and 0.5 millimeters, but the design is a pure U-shape corresponding to FIG. 4. An improvement from a flexibility of 0.10 millimeters to 0.32 millimeters constitutes a 200% improvement, although q and w are relatively equal. For Ref B the material and wall thickness are the same as Example 7, i.e. M 5049 and 1.0 millimeters, but the design is a pure U-shape corresponding to FIG. 5. An improvement from a flexibility of 0.52 millimeters to 1.35 millimeters constitutes a near 200% improvement, although q and w also here are relatively equal.

In this document the term "radius of curvature" is to be understood as the radius of a circle that touches a curve in a point on its concave side and is of such a size that the circle and the curve have common tangents to both sides of said point.

The term "curvature" is to be understood as the inverse radius of curvature.

In practice, radius of curvature and curvature may be found for both concave and convex surfaces. Utilizing high-resolution optical measuring techniques, objective data could be generated for determining the radius of curvature and the curvature of surfaces on a manufactured convolution. The data may also be used to determine whether any arbitrary convolution found on the market is in conflict with the scope of protection. To date, such systems easily generate 12-bit resolution scanning with a measuring point distance down to a hundredth of a millimeter. This data can then be used for further analysis with standard CAD software or mathematical analysis software such as Mathcad®.

The pitch-height ratio is defined as the pitch q divided by two times the height w, i.e. (q/2w).

It is to be understood that the invention as disclosed in the description and in the figures may be modified and changed and still be within the scope of the invention as claimed hereinafter.

The invention claimed is:

1. A flexible, tubular metal device with an internal diameter up to 60 millimeters, the device comprising a metal wall in which are formed one or more nonhelical corrugated convolutions that define a nonhelical corrugated outside surface of the device and a nonhelical corrugated inside surface of the device, each of the convolutions having rounded radially-outward portions and rounded radially-inward portions axially adjacent each other, the outside surface defined by each convolution of the device having first and second sections with change positions therebetween, the first section of each convolution extending from one of the change positions to another of the change positions via one of the radially-outward portions, the second section of each convolution extending from one of the change positions to another of the change positions via one of the radially-inward portions, the length of each of the first sections being at least 10% longer than the length of each of the second sections, the outside surface of each convolution having a non-constant curvature derived from a curve that is continuous in the first and second sections and defined by the intersection of the outside surface and a plane through the longitudinal axis of the device, the curvature of the outside surface being numerically smaller at each of the radially-outward portions than at each of the radially-inward portions, the curve within each of the first sections having one global maximum located within the radially-outward portion thereof, the curve within each of the second sections having a global minimum located at the radially-inward portion thereof, the curvature of the curve changing sign only once at each of the change positions.

2. A device according to claim 1, wherein the length of each of the first sections is at least 50% longer than the length of each of the second sections.

3. A device according to claim 1, wherein the curvature of the convolutions is numerically at least 20% smaller within the radially-outward portions than within the radially-inward portions.

4. A,device according to claim 1, wherein the convolutions have a pitch-height ratio (q) of about 0.7 to about 1.0.

5. A device according to claim 1, wherein the curvature of the curve within each first section has a local minimum curvature at the global maximum.

6. A device according to claim 1, wherein the curve comprises a curve portion that extends from a point corresponding to the global minimum at a first of the radially-inward portions, through the global maximum at an immediately adjacent one of the radially-outward portions, and to a point corresponding to the global minimum at a second of the radially-inward portions immediately adjacent the one of the radially-outward portions, the section of the curve being symmetric about an axis perpendicular to the longitudinal axis and through the global maximum within the immediately adjacent one of the radially-outward portions.

7. A device according to claim 1, wherein a majority of the convolutions are substantially identical.

8. A device according to claim 1, wherein the device is made of an extruded metal alloy pipe and the convolutions are formed in a deep drawing process.

9. A device according to claim 8, wherein the metal alloy is stainless steel or an aluminium alloy.

10. A device according to claim 1, wherein the curve is at least two times differentiable.

11. A device according to claim 1, wherein the curve is at least two times differentiable.

12. A flexible, tubular bellows with an internal diameter up to 60 millimeters, the bellows being defined by a metal wall in which are formed nonhelical corrugated convolutions that define a nonhelical corrugated outside surface of the bellows and a nonhelical corrugated inside surface of the bellows and are oriented perpendicular to a longitudinal axis of the bellows, each of the convolutions having rounded diametrically-opposed radially-outward portions and rounded diametrically-opposed radially-inward portions axially adjacent each other, the outside surface defined by each convolution of the bellows having first and second sections with change positions therebetween, the first section of each convolution extending from one of the change positions to another of the change positions via one of the radially-outward portions, the second section of each convolution extending from one of the change positions to another of the change positions via one of the radially-inward portions, the length of each of the first sections being at least 10% longer than the length of each of the second sections, the outside surface of each convolution having a non-constant curvature derived from a curve that is continuous in the first and second sections and defined by the intersection of the outside surface and a plane through a longitudinal axis of the bellows, the curvature of the outside surface being numerically smaller at each of the radially-outward portions than at each of the radially-inward portions, the curve within each of the first sections having one global maximum located at the radially-outward portion thereof, the curve within each of the second sections having a global minimum located at the radially-inward portion thereof, the curvature of the curve being zero at the change positions and changing sign only once between adjacent pairs of the radially-outward and radially-inward portions at the change position therebetween.

* * * * *